United States Patent [19]
Popovici et al.

[11] Patent Number: 5,499,270
[45] Date of Patent: Mar. 12, 1996

[54] SPECTRAL ENCODING-DECODING SYSTEM AND METHOD THEREOF

[75] Inventors: Lascar B. Popovici; Daniel Vliegen, both of Montréal, Canada

[73] Assignee: Pierre Charrier, St-Hubert, Canada

[21] Appl. No.: 283,803

[22] Filed: Aug. 1, 1994

[51] Int. Cl.$^6$ .............................. H04L 27/10; H04B 1/38
[52] U.S. Cl. ..................... 375/272; 375/219; 375/303; 375/334; 329/300; 332/100
[58] Field of Search .................... 375/219, 220, 375/222, 257, 259, 272, 377, 303, 334; 329/350, 323, 358; 332/100; 370/32

[56] References Cited

U.S. PATENT DOCUMENTS

| | | | |
|---|---|---|---|
| 3,808,537 | 4/1974 | Sarati et al. | 375/303 |
| 3,890,581 | 6/1975 | Stuart et al. | 332/101 |
| 4,355,399 | 10/1982 | Timor | 375/202 |
| 4,425,642 | 1/1984 | Moses et al. | 370/76 |
| 4,495,620 | 1/1985 | Steele et al. | 370/118 |
| 4,584,694 | 4/1986 | Gumacos | 375/316 |
| 4,593,389 | 6/1986 | Wurzburg et al. | 370/110.1 |
| 4,606,049 | 8/1986 | Daniel | 375/272 |
| 4,625,318 | 11/1986 | Snyder | 375/273 |
| 4,635,278 | 1/1987 | Maloon et al. | 375/303 |
| 5,127,040 | 6/1992 | D'Avello et al. | 379/58 |
| 5,227,741 | 7/1993 | Marchetto et al. | 332/100 |

*Primary Examiner*—Young Tse
*Attorney, Agent, or Firm*—Merchant, Gould, Smith, Edell, Welter & Schmidt

[57] ABSTRACT

The spectral encoding-decoding system and method are for encoding a sequence of N data bits where N is a predetermined integer, into an information signal to be transmitted on a communication medium, and for decoding the information signal transmitted on the communication signal into an estimated sequence of N data bits. The system comprises an encoder and a decoder. The encoder receives the sequence of N data bits, encodes the sequence into the information signal, and emits the information on the communication medium. The decoder receives the information signal transmitted on the communication medium, decodes the information signal and transmits the estimated sequence of N data bits. The method corresponds to the operations performed by the system.

15 Claims, 8 Drawing Sheets

SPECTRAL ENCODING-DECODING SYSTEM AND METHOD THEREOF

BACKGROUND OF THE INVENTION a) Field of the Invention

The present invention relates to a spectral encoding-decoding system and a method, and more particularly to a system and a method for binary signals.

b) Brief Description of the Related Art

Since the popularization of personal computers, transmission of binary signals has been of great interest. One of the systems used to transmit binary signals from a computer to another is the "modem". The modem transmits successively each bit of a binary signal, by representing them by predetermined tones.

Also known in the art is U.S. Pat. No. 4,606,049 (Daniel) which describes a remote transmitter control system. This system modulates binary signals by two signals $f_0$ and $f_1$ which are harmonics and in-phase.

In U.S. Pat. No. 4,635,278 (Maloon) there is described an autoregressive digital telecommunications system which converts each bit of a byte in one of two predetermined tones. At the receiver, a parametric model-based spectrum analysis is performed to find the constituents of the received signal, by deriving the frequencies of the spectral components.

SUMMARY OF THE INVENTION

It is an object of the present invention to provide a spectral encoding-decoding system that is compact and simple, and that does not require large calculating capabilities.

In accordance with the present invention, this object is achieved with a spectral encoding-decoding system. The spectral encoding-decoding system is for encoding sequence of N data bits where N is a predetermined integer into an information signal to be transmitted on a communication medium, and for decoding said information signal transmitted on said communication medium into an estimated sequence of N data bits. The system comprises:

an encoder comprising:
  a first receiver having an input for receiving the sequence of N data bits and an output for outputting the sequence received;
  a sampler having an input connected to the output of said first receiver for assigning to each of the N data bits of the sequence received by said first receiver a successive position P where P is an integer greater than zero, and smaller than N, and having an output for outputting the position P;
  a sinusoid generator having an input connected to the output of said sampler for generating a carrier signal having a predetermined frequency $f_1$, and for generating harmonic signals of frequencies equal to $(f_0*P)$ for each data bit having a value 1, where $f_0$ is a predetermined frequency different than the frequency $f_1$, and having an output for outputting the carrier signal and the harmonic signals;
  a combiner having an input connected to the output of said sinusoid generator for combining the harmonic signals and the carrier signal whereby forming the information signal, and having an output for outputting the information signal; and
  a first emitter having an input connected to the output of said combiner for receiving the information signal from said combiner, and having an output connected to a communication medium for transmitting the information signal on said communication medium;

a decoder comprising:
  a second receiver having an input connected to the communication medium for receiving the information signal transmitted, and an output for outputting the information signal received;
  a sinusoid/cosinusoid generator for generating P pairs of sinusoid and cosinusoid of frequency $(f_0*P)$, each pair corresponding to a different value of P, said sinusoid/cosinusoid generator having an output for outputting the P pairs of sinusoid and cosinusoid;
  a multiplier having a first input connected to the output of said second receiver and a second input connected to the output of said sinusoid/cosinusoid generator, for multiplying the information signal received by said second receiver to each of sinusoid and cosinusoid of the P pairs generated by said sinusoid/ cosinusoid generator to obtain P corresponding pairs of sinresult and cosresult, said multiplier having an output for outputting the P pairs of sinresult and cosresult;
  calculating means having an input connected to the output of said multiplier for squaring and adding each sinresult and cosresult of each pair, to obtain P frequency components, and having an output for outputting the P frequency components;
  comparing means having an input connected to the output of said calculating means for comparing each of the P frequency components with a predetermined level, for generating estimated bits of value 1 for each frequency component greater than the predetermined level and for constructing the estimated sequence of N data bits, said comparing means having an output for outputting the estimated sequence of N data bits; and
  a second emitter having an input connected to the output of said comparing means for receiving the estimated sequence of N data bits and having an output for transmitting the estimated sequence of N data bits and the communications medium.

Also in accordance with the present invention, this object is achieved with a method for spectrally encoding-decoding, which comprises the steps of:

a) encoding said sequence of N data bits by:
  a1) receiving said sequence of N data bits;
  a2) generating a carrier signal having a frequency predetermined $f_1$;
  a3) assigning to each of said N data bits received in step (a1) successive positions P, said positions being integers greater than zero and smaller than (N+1);
  a4) for each of said N data bits received in step (a1), verifying whether said data bit equals 1 and, generating an harmonic signal having a frequency equal to $(f_0* P)$, where P represents the position of the data bit and $f_0$ is a predetermined frequency different than $f_1$ if said data bit equals 1;
  a5) combining said harmonic signals generated in step (a4) and said carrier signal generated in step (a2) to form said information signal; and
  a6) transmitting said information signal formed in step (a5) in a communication medium;

b) decoding said information signal by:
  b1) receiving said information signal transmitted in step (a6);

b2) determining which of said estimated data bits are equal to 1 by:
  b2.1) setting a counter C to 1;
  b2.2) verifying whether C is smaller than (N+1), and:
    b2.2.a) generating a sinusoid and a cosinusoid of frequency ($f_0 * C$);
    b2.2.b) multiplying the information signal received in step (b1) to the sinusoid generated in step (b2.2.a) to obtain a sinresult and to the cosinusoid generated in step (b2.2.a) to obtain a cosresult; and
    b2.2.c) squaring the sinresult and the cosresult obtained in step (b2.2.b) and adding the squared sinresult and cosresult to obtain a frequency component;
    b2.2.d) verifying whether said frequency component calculated in step (b2.2.c) is greater than a predetermined level and assigning to the data bit of the estimated sequence having a position equal to C a value 1 if said frequency component calculated in step (b2.2.c) is greater than a predetermined level, else assigning to the data bit of the estimated sequence having its position equal to C a value 0; and
    b2.2.e) incrementing C and going to step (b2.2);
b3) emitting the estimated sequence of N data bits.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

DESCRIPTION OF PREFERRED EMBODIMENTS

Figure 1:
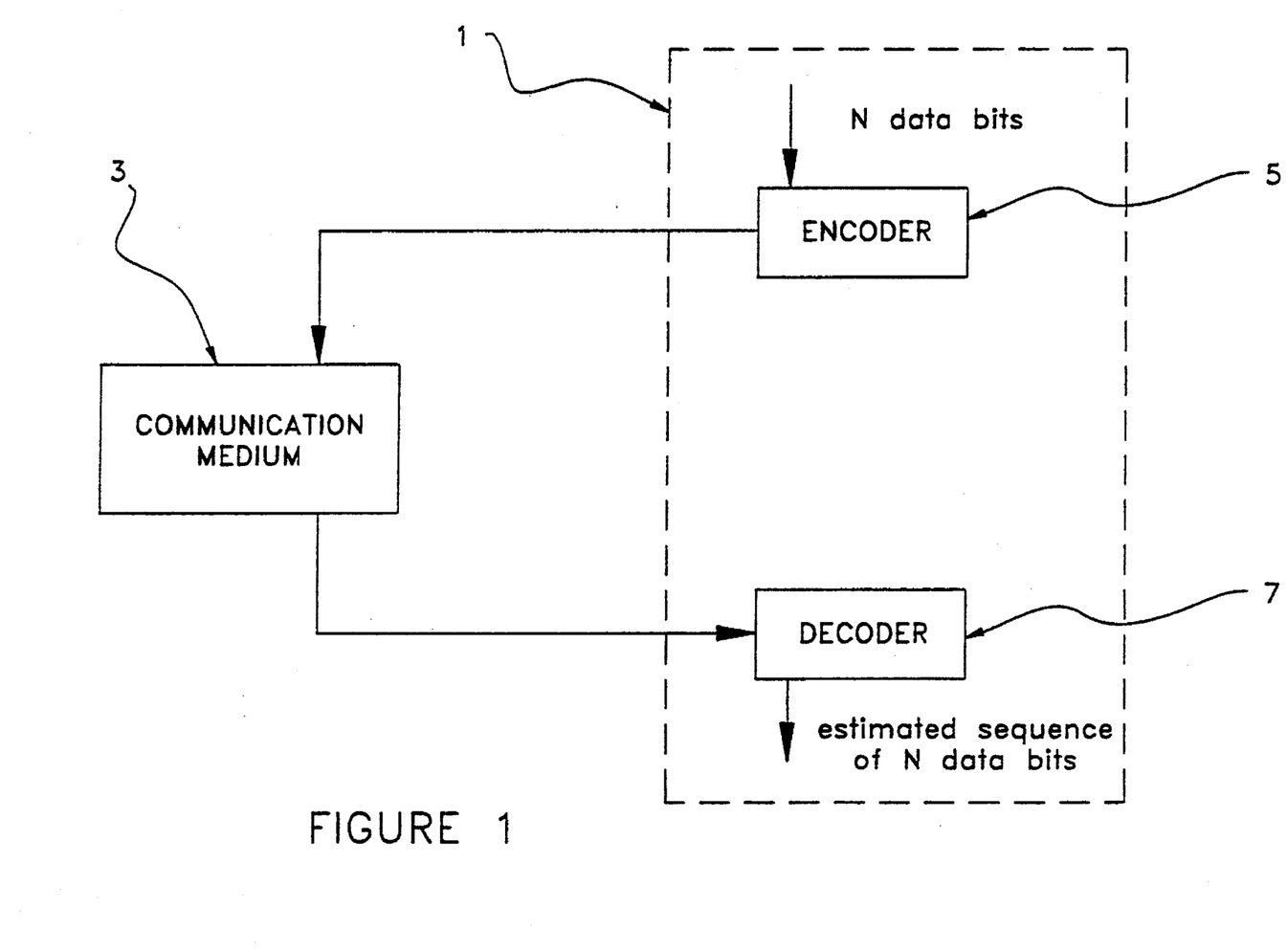
FIG. 1 is a block diagram showing a spectral encoding-decoding system according to the invention, connected to a communication medium.

Referring to FIG. 1, there is shown a spectral encoding-decoding system 1 for encoding a sequence of N data bits where N is a predetermined integer into an information signal to be transmitted on a communication medium 3, and for decoding the information signal transmitted by the communication medium 3 into an estimated sequence of N data bits. The sequence of N data bits may be generated by a computer, or by any system that generates data bits. The communication medium 3 onto which is transmitted the information signal may be, for example, a coaxial cable, a telephone line, a fiber optic, a radio relay system, or any other medium that transmits waves.

The spectral encoding-decoding system 1 is composed of two parts: an encoder 5 and a decoder 7. The encoder 5 and the decoder 7 are separated by the communication medium 3. The encoder 5 receives the sequence of N data bits, encodes it into an information signal, and emits the information signal on the communication medium 3. The decoder 7 receives the information signal transmitted on the communication medium 3, decodes the information signal received into an estimated sequence of N data bits, and transmits the estimated sequence of N data bits.

Figure 2:
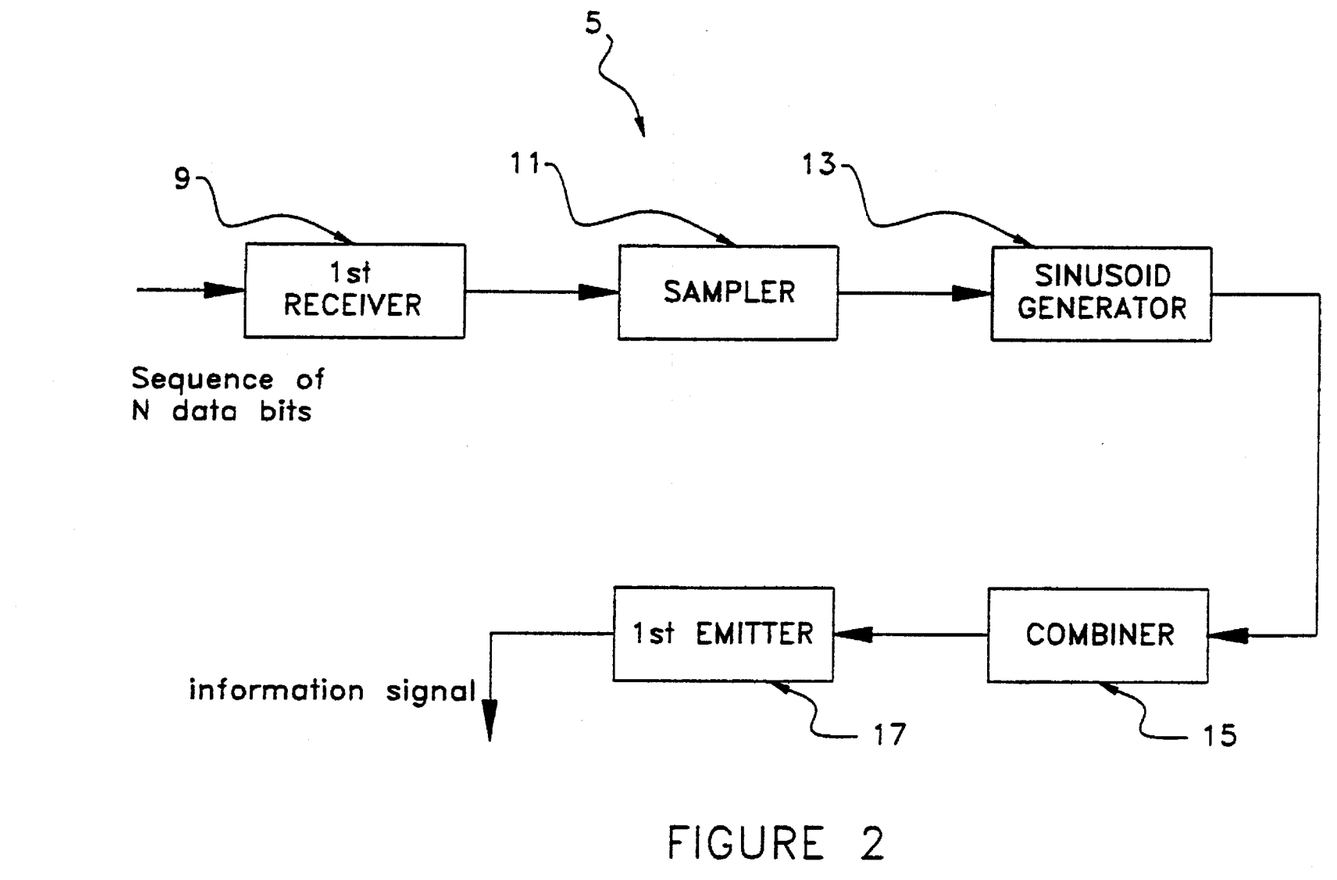
FIG. 2 is a block diagram showing an encoder according to a first embodiment of the invention.

Referring to FIG. 2, there is shown the encoder 5 according to a first embodiment of the invention. The encoder 5 consists of a first receiver 9, a sampler 11, a sinusoid generator 13, a combiner 15 and a first emitter 17.

The first receiver 9 is connected to a computer or to a system that generates sequences of N data bits, for receiving the sequence generated. The first receiver 9 may consist, for example, of an input/output port of a computer, also known as RS-232, or of a computer cable.

The N data bits received by the first receiver 9 are then handled by the sampler 11. The sampler assigns to each of the N data bits a successive position P, where P is an integer greater than zero and smaller than (N+1). If the sequence consists of N serial data bits, the sampler 11 may be an asynchronous communication interface that converts the N serial data bits into N parallel data bits, while assigning to each data bit a position P.

The sinusoid generator 13 is connected to the sampler 11, and receives the N data bits with their respective positions. The sinusoid generator 13 verifies the value of each data bit, and generates a harmonic signal having a frequency equal to ($f_0 * P$) for each data bit having a value 1, where $f_0$ is a predetermined frequency. For example, for a sequence of 4 bits corresponding to 1011, with a predetermined frequency $f_0$ of 200 kHz, harmonic signals of 200 kHz, 600 kHz and 800 kHz would be generated. The sinusoid generator 13 also generate a carrier signal having a predetermined frequency $f_1$, much higher than the harmonic signals. The sinusoid generator 13 may consist of a wave generator, of a combination of oscillators or of any frequency adjustable oscillating means.

An output of the sinusoid generator 13 is connected to a combiner 15. The combiner receives all the harmonic signals generated by the sinusoid generator 13, and combines them into an information signal. Moreover, if the sinusoid generator 13 generates a carrier signal $f_1$, the combiner 15 combines the harmonic signals to the carrier signal. The combiner 15 may consist, for example of an analog mixer.

The information signal obtained by the combiner 15 is received by the first emitter 17, which is also connected to the communication medium 3, onto which is transmitted the information signal. Depending on the nature of the communication medium 3, the first emitter 17 may consist, for example, of a tone generator, a laser diode or a radio. Moreover, if the communication medium 3 generates noise and parasites, an amplifier may be added to the first emitter 17 for amplifying the information signal before transmitting it on the communication medium 3.

Figure 3:
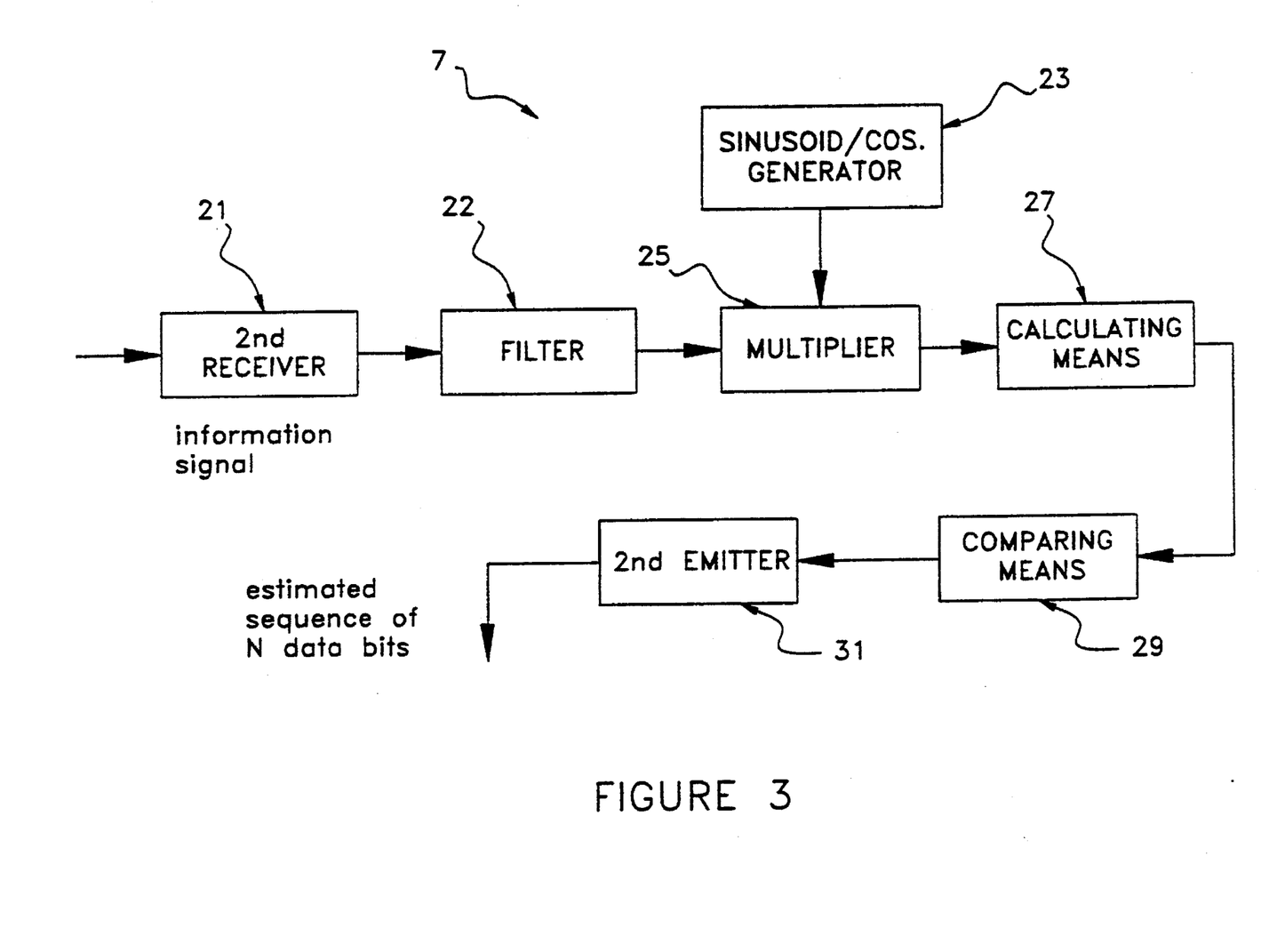
FIG. 3 is a block diagram showing a decoder according to a first embodiment of the invention.

Referring now to FIG. 3, there is shown the decoder 7 of the spectral encoding-decoding system 1, according to a first embodiment. The decoder 7 consists of a second receiver 21, a filter 22, a sinusoid/cosinusoid generator 23, a multiplier 25, calculating means 27, comparing means 29 and a second emitter 31.

The second receiver 21 is connected to the communication medium 3, and receives the information signal transmitted onto it. An output of the second receiver 21 is connected to the multiplier 25 for transferring the information signal received to the multiplier 25.

As for the first emitter 17, the second receiver 21 is dependant of the nature of the communication medium 3. The second receiver 21 is connected to the multiplier 25 through a filter. The filter 22 has an input connected to the second receiver 21 for filtering the information signal received and freeing it of some noise and parasites while producing a filtered information signal. The filter 22 also has an output for outputting the filtered information signal.

Upon reception of the information signal, the second receiver 21 also activate the sinusoid/cosinusoid generator 23. The sinusoid/cosinusoid generator 23 is also connected to the multiplier 25. It generates P pairs of sinusoid and cosinusoid of frequency ($f_0$* P), where each pair corresponds to a different value of P. The sinusoid/cosinusoid generator 23 may consist of a sine generator having phase adjustment or of a group of linked oscillators.

The multiplier 25 receives the information signal, and multiplies it to each component of each P pairs of sinusoid and cosinusoid, to produce P pairs of sinresult and cosresult. The multiplier is also connected to the calculating means to which it transfers the P pairs of sinresult and cosresult. The multiplier may consist, for example, of a combination of mixers, each receiving the information signal and one of the component of a pair of sinusoid and cosinusoid.

The calculating means 27 receives the P pairs of sinresult and cosresult. It squares and adds each sinresult and cosresult of each pair to obtain P frequency components. The calculating means 27 may consist for example, of a calculating chip.

The frequency components calculated by the calculating means 27 are sent to the comparing means 29, which compares each of the P frequency components with a predetermined level. When one of the frequency components is greater than the predetermined level, the comparing means 29 generates an estimated bit of value 1 having a position P. The comparing means 29 verifies each of the frequency component and constructs the estimated sequence of N data bits, by generating bits of value 1 at corresponding positions.

The comparing means 29 also has an output connected to the second emitter 31, which receives the estimated sequence of N data bits. The second emitter 31 outputs the estimated sequence of N data bits to a receiving binary system. The second emitter 31 is of the same type than the first receiver 9, since it communicates with the same type of binary system.

Figure 4:
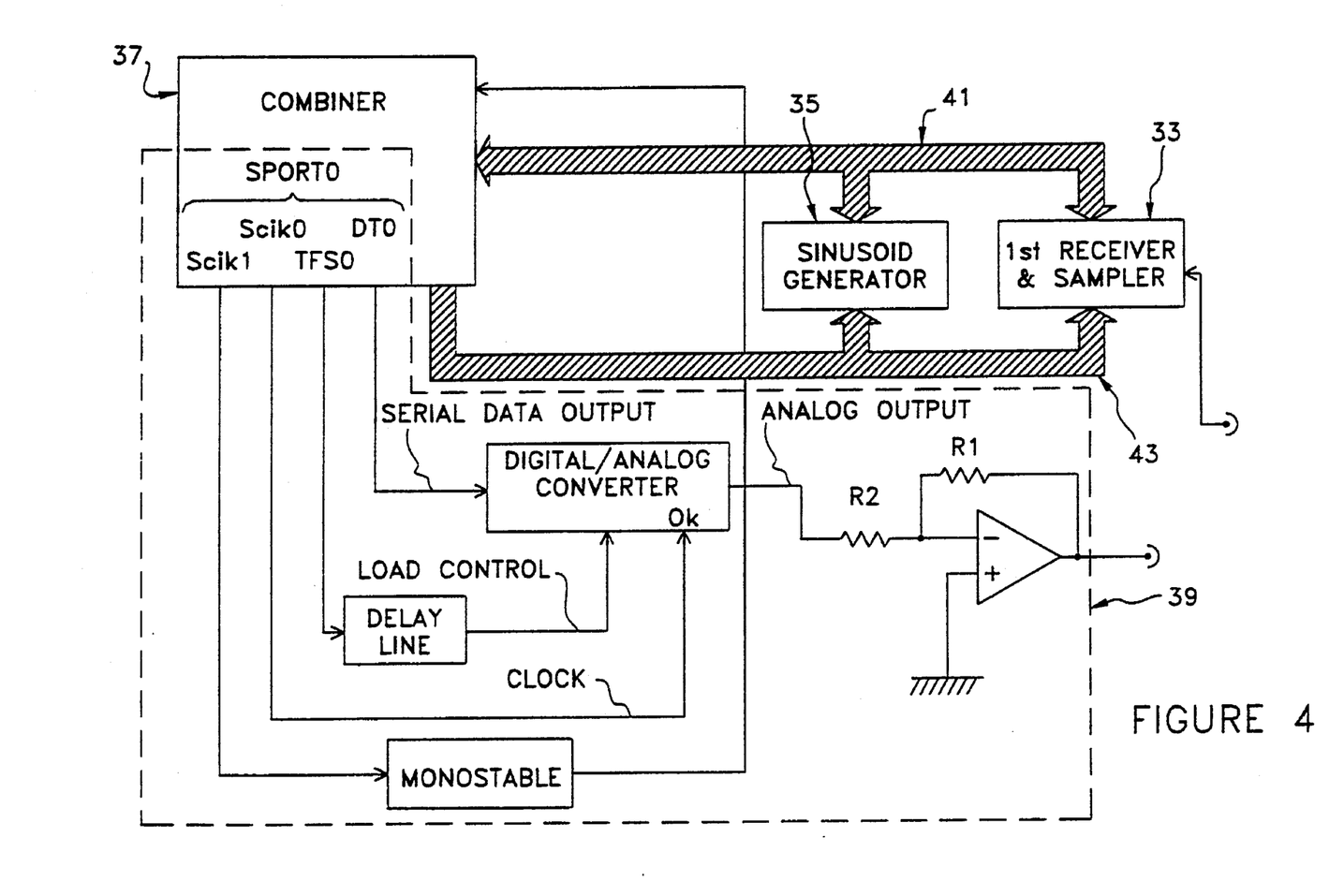
FIG. 4 is a block diagram showing an encoder according to a second embodiment of the invention.

Referring now to FIG. 4, there is shown an encoder 5 according to a second embodiment. For compactness, this encoder is entirely numerical. It consists of a combined first receiver and sampler 33, a sinusoid generator 35, a combiner 37 and a first emitter 39, the first three being linked together by a data bus 41 and an address bus 43.

The first receiver and sampler 33 receives the sequence of N data bits and assigns to each data bit a position P. For sequences of N serial data bits, the first receiver and sampler 33 consists of an asynchronous communication interface that transforms the N serial data bits into N parallel data bits while assigning to each data bit a position P.

Upon recept of the sequence of N data bits, the first receiver and sampler 33 advises the sinusoid generator 35 by the data bus 41. The sinusoid generator 35 consists of a sinusoid memory storing binary samples of a carrier signal of frequency $f_1$ ., taken over a certain time period, and binary samples of harmonic signals of frequencies ($f_0$*P), taken over the same time period. For generating a carrier signal or a harmonic signal, the sinusoid generator 35 reads successively each sample of the signal stored in the sinusoid memory. The sinusoid generator 35 also verifies the value of each data bit, and generates binary samples of harmonic signals of frequency ($f_0$*P) for each data bit of value 1.

The combiner 37 receives the binary samples of each harmonic signal and of the carrier signal. It combines the corresponding samples of the harmonic and carrier signals to obtain binary samples of the corresponding information signal. The combiner 15 may consist of a microprocessor.

The binary samples of the information signal are sent to the first emitter 39. This first emitter 39 consists of a digital/analog converter used in combination with monostables and a phase delay, for converting each binary sample of the information signal, into an analog sample of the information signal. All analog samples of the information signal are then emitted successively onto the communication medium 3, by the first emitter 39.

Figure 5:
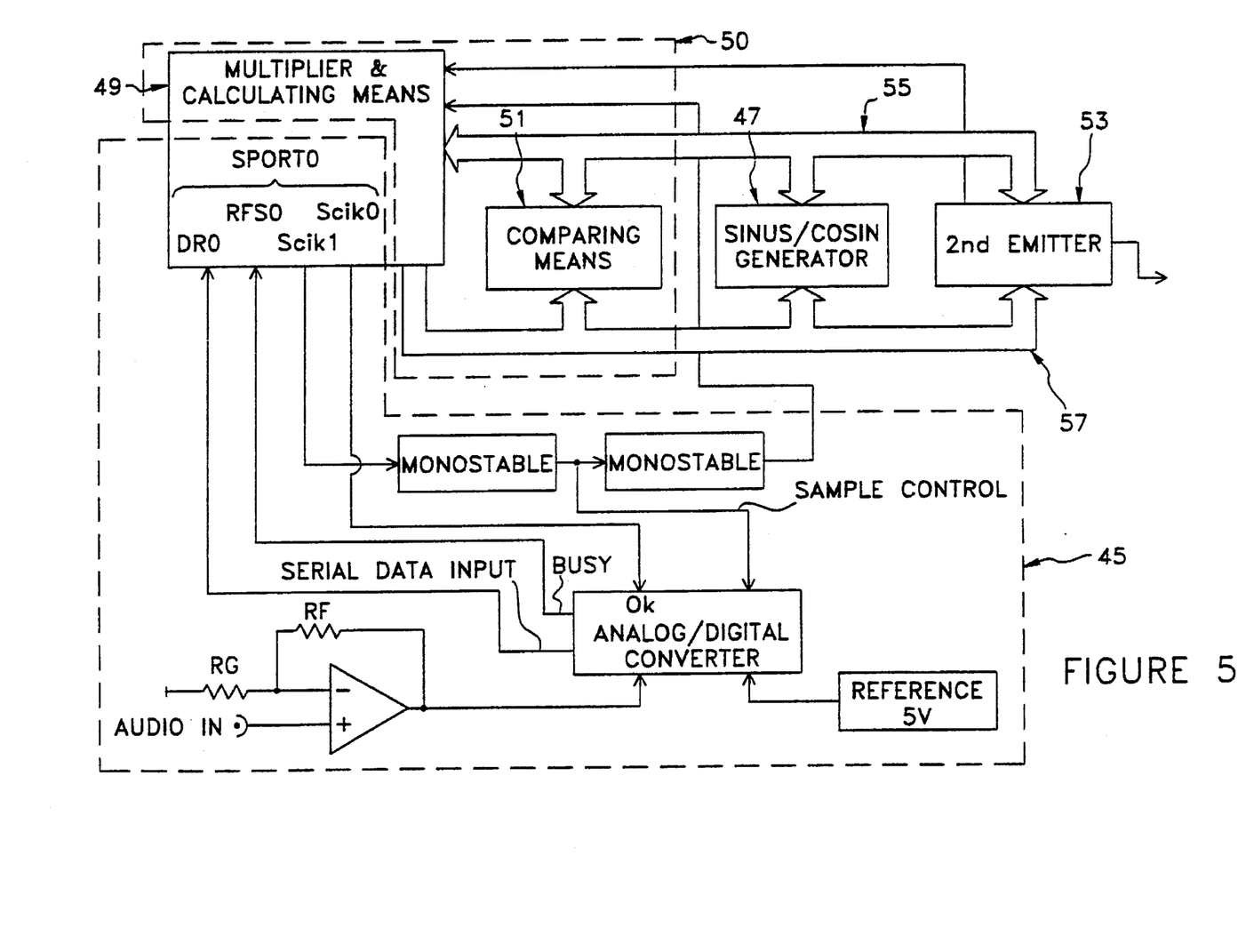
FIG. 5 is a block diagram showing a decoder according to a second embodiment of the invention.

Referring now to FIG. 5, there is shown the decoder 7 according to a second embodiment. For compactness, this second embodiment of the decoder 7 is also entirely numerical. It consists of a second receiver 45, a sinusoid/cosinusoid generator 47, a combined multiplier and calculating means 49, a comparing means 51, and of a second emitter 53. The multiplier and calculating means 49 , the comparing means 51, the sinusoid/cosinusoid generator 47 and the second emitter 53 are all linked together with a data bus 55 and an address bus 57. Moreover, the calculating means 49 and the comparing means 51 can be embodied by a microprocessor 50.

The second receiver 45 is connected to the communication medium 3, and receives the information signal. It samples the information signal, and converts each sample into a binary sample of information signal. The second receiver 45 preferably consists of an analog sampler, used in combination with an analog/digital converter.

The binary samples of information signal are sent to the multiplier and calculating means 49. Upon recept of the binary samples, the multiplier and calculating means 49 activate the sinusoid/cosinusoid generator 47 through the data bus 55, to generate samples of pairs of sinusoid and cosinusoid for each frequency ($f_0$*P). The samples of pairs of sinusoid and cosinusoid are sent to the multiplier and calculating means 49, where each sample of sinusoid and cosinusoid of each pair is multiplied with a corresponding binary sample of the information signal, to obtain P pairs of samples of sinresult and cosresult.

The multiplier and calculating means 49 then adds all the samples of each sinresult and of each cosresult to obtain P pairs of sinresult and cosresult. The multiplier and calculating means 49 then squares and adds each sinresult and each cosresult of each pair, to obtain P frequency components.

The comparing means 51 receives the P frequency components through the data bus 55, and compares each frequency component with a predetermined level, and generates an estimated bit of value 1 at a position P when a $P_{th}$ frequency component is greater than the predetermined level. The estimated data bits are then sent to the second emitter 53 which is of the same type than the first receiver 33. The second emitter 53 emits the estimated sequence of N data bits.

Whatever be the embodiment, bilateral communications can be achieved by using two spectral encoding-decoding systems 1 simultaneously.

Figure 6:
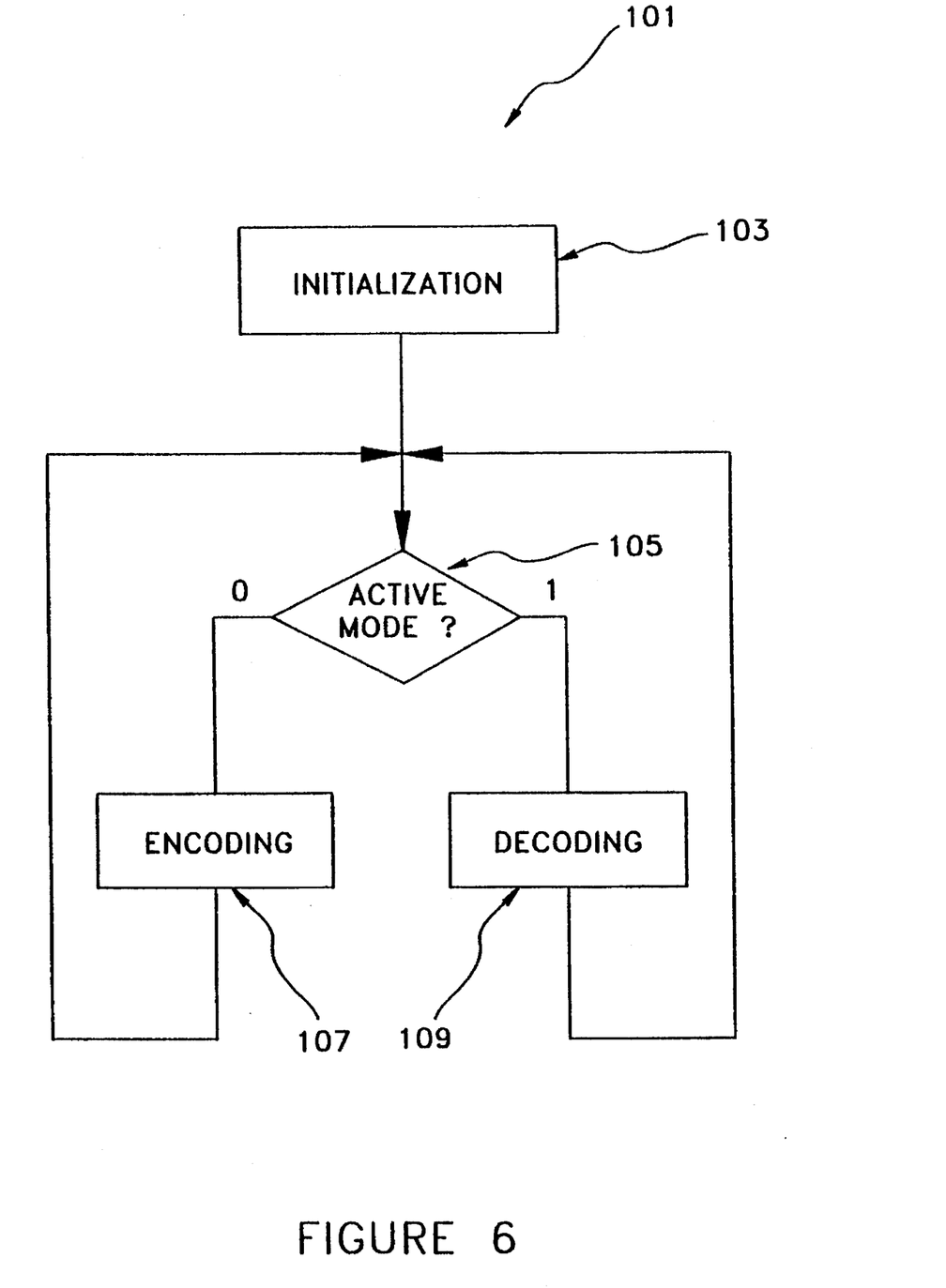
FIG. 6 is a block diagram showing a general routine of a method for spectrally encoding-decoding according to the present invention.

Referring now to FIG. 6, there is shown a general routine 101 of the method for spectrally encoding and decoding a sequence of N data bits. The general routine performs an initialization 103 of the system 1 and afterwards determines whether an active mode 105 is 0 or 1, where 0 represents encoding 107 and 1 represents decoding 109.

Figure 7:
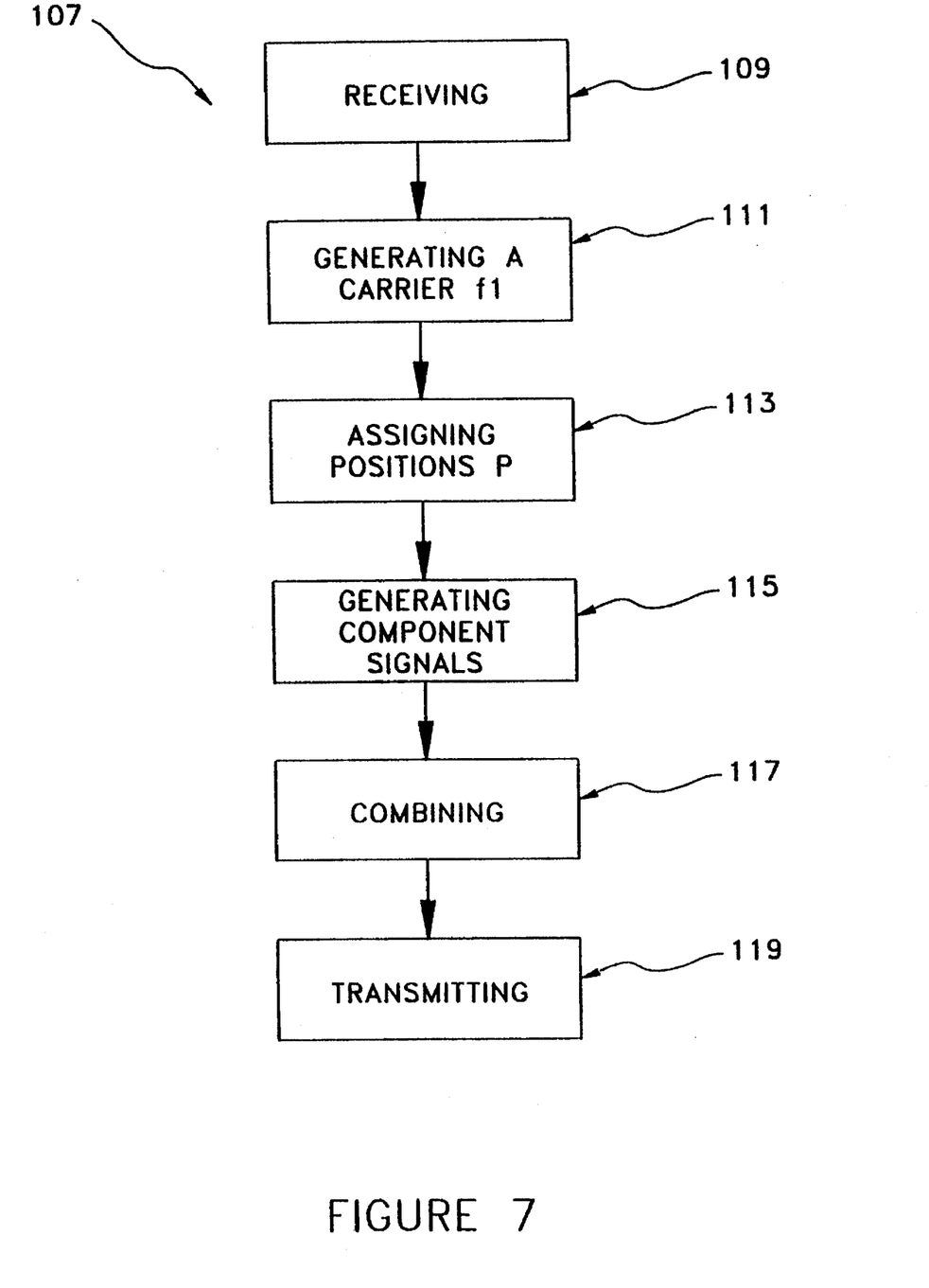
FIG. 7 is a block diagram showing an encoding routine according to the invention.

Referring now to FIG. 7, there is shown the steps performed for encoding 107 a sequence of N data bits into a corresponding information signal. Firstly, the sequence of N data bits is received 109. Then, a carrier signal of frequency $f_1$ is generated 111. The next step consists of assigning 113 successive positions P to each of the N data bits of the sequence. Each of the positions assigned are integers greater than zero, and smaller than (N+1).

The value of each data bit is then verified 115, and for each data bit of value 1, an harmonic signal of frequency ($f_0$*P) is generated, where P represents the position of the data bit of value 1.

The component signals and carrier signal are then combined 117 to form the corresponding information signal which is transmitted 119 onto the communication medium 3.

Figure 8:
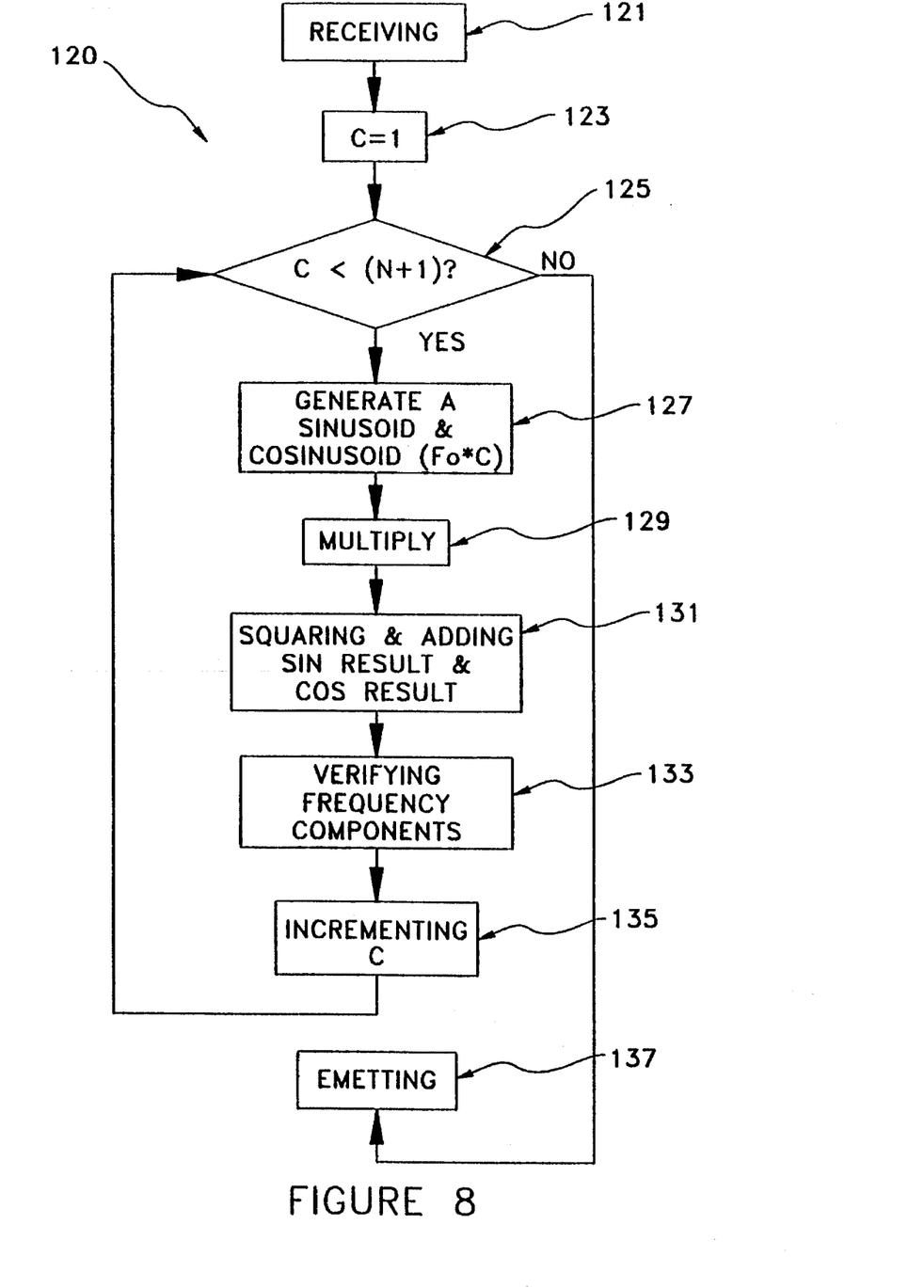
FIG. 8 is a block diagram showing a decoding routine according to the invention.

Referring now to FIG. 8, there are shown the steps performed for decoding 120 the information signal. Firstly, the information signal is received 121. Then, a counter C is set to 1 123.

The following step consists of verifying 125 whether the value of the counter C is less than (N+1), where C corresponds to the P positions available. If yes, a sinusoid and a cosinusoid of frequency ($f_0$*C) are generated 127, the information signal received is multiplied 129 to the sinusoid and cosinusoid to obtain a sinresult and a cosresult, the sinresult and cosresult are squared and then added to obtain a frequency component 131, the value of the frequency component is compared 133 to a predetermined level and an estimated data bit of value 1 is generated at position C if the value of the frequency component is greater than the predetermined level, and the counter C is incremented 135 of 1. If no, the estimated sequence of N data bits is emitted 137.

For sequences of N serial data bits, the receiving step also converts the sequence of N serial data bits into a sequence of N parallel data bits, and the emitting of the estimated sequence also converts the estimated sequence of N data bits into an estimated sequence of N serial data bits.

The spectral encoding-decoding system and method offer a simple way to encode-decode sequences of data bits, while improving the transmission rate. Moreover, the system can be compact, by making it completely numerical.

Although the present invention has been explained hereinabove by way of preferred embodiments thereof, it should be pointed out that any modifications to these preferred embodiments, within the scope of the appended claims, are not deemed to change or alter the nature and scope of the present invention.

We claim:

1. A spectral encoding-decoding system for encoding a sequence of N data bits where N is a predetermined integer into an information signal to be transmitted on a communication medium, and for decoding said information signal transmitted on said communication medium into an estimated sequence of N data bits, said system comprising:

an encoder comprising:
a first receiver having an input for receiving the sequence of N data bits and an output for outputting the sequence received;
a sampler having an input connected to the output of said first receiver for assigning to each of the N data bits of the sequence received by said first receiver a successive position P where P is an integer greater than zero and smaller than (N+1), and having an output for outputting the position P;
a sinusoid generator having an input connected to the output of said sampler for generating a carrier signal having a predetermined frequency $f_1$ and for generating harmonic signals of frequencies equal to ($f_0$*P) for each data bit having a value 1 where $f_0$ is a predetermined frequency different than the frequency $f_1$, and having an output for outputting the carrier signal and the harmonic signals;
a combiner having an input connected to the output of said sinusoid generator for combining the harmonic signals and the carrier signal whereby forming the information signal, and having an output for outputting the information signal; and
a first emitter having an input connected to the output of said combiner for receiving the information signal from said combiner, and having an output connected to said communication medium for transmitting the information signal on said communication medium;

a decoder comprising:
a second receiver having an input connected to the communication medium for receiving the information signal transmitted, and an output for outputting the information signal received;
a sinusoid/cosinusoid generator for generating P pairs of sinusoid and cosinusoid of frequency ($f_0$*P), each pair corresponding to a different value of P, said sinusoid/cosinusoid generator having an output for outputting the P pairs of sinusoid and cosinusoid;
a multiplier having a first input coupled to the output of said second receiver and a second input connected to the output of said sinusoid/cosinusoid generator, for multiplying the information signal received by said second receiver to each of the sinusoid and cosinusoid of the P pairs generated by said sinusoid/cosinusoid generator to obtain P corresponding pairs of sinresult and cosresult, said multiplier having an output for outputting the P pairs of sinresult and cosresult;
calculating means having an input connected to the output of said multiplier for squaring and adding each sinresult and cosresult of each pair to obtain P frequency components, and having an output for outputting the P frequency components;
comparing means having an input connected to the output of said calculating means for comparing each of the P frequency components with a predetermined level, for generating estimated bits of value 1 for each frequency component greater than the predetermined level and for constructing the estimated sequence of N data bits, said comparing means having an output for outputting the estimated sequence of N data bits; and
a second emitter having an input connected to the output of said comparing means for receiving the estimated sequence of N data bits and having an output for transmitting the estimated sequence of N data bits.

2. A system according to claim 1, wherein said decoder further comprises a filter having an input connected to the output of said second receiver for filtering the information signal, and an output connected to said multiplier.

3. A system according to claim 1, wherein said second receiver is a sampler for sampling the information signal, and an analog/digital converter for converting each samples of the information signal into binary samples of information signal.

4. A system according to claim 3, wherein said sinusoid/cosinusoid generator is a sinusoid/cosinusoid memory for storing samples of binary sinusoid and cosinusoid of frequencies ($f_0*P$).

5. A system according to claim 4, wherein said multiplier is a digital multiplier multiplying each sample of binary information signal to corresponding sample of binary sinusoid and cosinusoid to obtain samples of binary sinresult and cosresult.

6. A system according to claim 5, wherein said calculating means adds the samples of each binary sinresult and cosresult, and squares them and adds them to obtain P frequency components.

7. A system according to claim 5, wherein said calculating means and said comparing means are a microprocessor.

8. A system according to claim 7, wherein said second emitter is an asynchronous communication interface converting said estimated sequence of N data bits into N serial data bits.

9. A system according to claim 1, wherein said sequence of N data bits is N serial data bits, and said sampler is an asynchronous communication interface changing the N serial data bits into N parallel data bits.

10. A system according to claim 1, wherein said sinusoid generator has a sinusoid memory storing samples of binary carrier signal and samples of binary harmonic signals, and said first emitter comprises a digital/analog converter converting each binary sample of the information signal into an analog signal of the information signal.

11. A spectral encoding-decoding system for encoding a sequence of N data bits where N is a predetermined integer into an information signal to be transmitted on a communication medium, and for decoding the information signal transmitted on said communication medium into an estimated sequence of N data bits, said system comprising:

an encoder comprising:
   a first receiver having an input for receiving the information sequence of N data bits and an output for outputting the sequence received;
   a sampler having an input connected to the output of said first receiver for assigning to each of the N data bits received by said first receiver a successive position P, where P is an integer greater than zero and smaller than (N+1), and having an output for outputting the position P;
   a sinusoid generator having an input connected to the output of said sampler for generating a carrier signal having a predetermined frequency $f_1$, and for generating harmonic signals of frequencies equal to ($f_0*P$) for each data bit having a value 1 where $f_0$ is a predetermined frequency different than $f_1$, and having an output for outputting the carrier signal and the harmonic signals;
   a combiner having an input connected to the output of said sinusoid generator for combining the harmonic signals and the carrier signal whereby forming the information signal, and having an output for outputting the information signal; and
   a first emitter having an input connected to the output of said combiner for receiving the information signal from said combiner, and having an output connected to said communication medium for transmitting the information signal on said communication medium;

a decoder comprising:
   a second receiver having an input connected to the communication medium for receiving the information signal transmitted, and an output for outputting the information signal received;
   a filter having an input connected to the output of said second receiver for filtering the information signal received by the second receiver and producing a filtered information signal, and having an output for outputting the filtered information signal;
   a sinusoid/cosinusoid generator for generating P pairs of sinusoid and cosinusoid of frequency ($f_0*P$), each pair corresponding to a different value of P, said sinusoid/cosinusoid generator having an output for outputting the P pairs of sinusoid and cosinusoid;
   a multiplier having a first input connected to the output of said filter for receiving the filtered information signal from said filter, a second input connected to the output of said sinusoid/cosinusoid generator for multiplying the filtered information signal to each of the sinusoid and cosinusoid of the P pairs generated by said sinusoid/cosinusoid generator to obtain P pairs of sinresult and cosresult, said multiplier having an output for outputting the P pairs of sinresult and cosresult;

calculating means having an input connected to the output of said multiplier for squaring and adding each sinresult and cosresult of each pair to obtain P frequency components, and having an output for outputting the P frequency components;

comparing means having an input connected to the output of said calculating means for comparing each of the P frequency components with a predetermined level, for generating estimated bits of value 1 for each frequency component greater than the predetermined level and for constructing the estimated sequence of N data bits, and having an output for outputting the estimated sequence of N data bits;

a second emitter having an input connected to the output of the comparing means and having an output for transmitting the estimated sequence of N data bits.

12. A method for encoding a sequence of N data bits into an information signal where N is a predetermined integer, to be transmitted on a communication medium, and for decoding the information signal transmitted by said communication medium into an estimated sequence of N data bits, said method comprising the steps of:

a) encoding said sequence of N data bits by:
   a1) receiving said sequence of N data bits;
   a2) generating a carrier signal having a predetermined frequency $f_1$;
   a3) assigning to each of said N data bits received in step (a1) successive positions P, said positions being integers greater than zero and smaller than (N+1);
   a4) for each of said N data bits received in step (a1), verifying whether each said data bit equals 1 and, generating an harmonic signal having a frequency equal to ($f_0*P$, where P represents the position of the data bit and $f_0$ is a predetermined frequency different than $f_1$) if said data bit equals 1;
   a5) combining said harmonic signals generated in step (a4) and said carrier signal generated in step (a2) to form said information signal; and
   a6) transmitting said information signal formed in step (a5) on said communication medium;

b) decoding said information signal by:
   b1) receiving said information signal transmitted in step (a6);
   b2) determining which of said estimated data bits are equal to 1 by:
      b2.1) setting a counter C to 1;

b2.2) verifying whether C is smaller than (N+1), and:
 b2.2.a) generating a sinusoid and a cosinusoid of frequency ($f_0*C$);
 b2.2.b) multiplying the information signal received in step (b1) to the sinusoid generated in step (b2.2.a) to obtain a sinresult and to the cosinusoid generated in step (b2.2.a) to obtain a cosresult; and
 b2.2.c) squaring the sinresult and the cosresult obtained in step (b2.2.b) and adding the squared sinresult and cosresult to obtain a frequency component;
 b2.2.d) verifying whether said frequency component calculated in step (b2.2.c) is greater than a predetermined level and assigning to the data bit of the estimated sequence having a position equal to C a value 1 if said frequency component calculated in step (b2.2.c) is greater than the predetermined level, else assigning to the data bit of the estimated sequence having its position equal to C a value 0; and
 b2.2.e) incrementing C and going to step (b2.2);
b3) emitting the estimated sequence of N data bits.

13. A method according to claim 12, wherein the information signal sequence of N data bits is N parallel bits.

14. A method according to claim 12, wherein the sequence of N data bits is N serial bits.

15. A method according to claim 12, wherein step (a3) further comprises converting the sequence of N serial data bits into a sequence of N parallel data bits, and step (b3) further comprises converting the estimated sequence of N data bits into N serial data bits.

* * * * *